Figure 1:
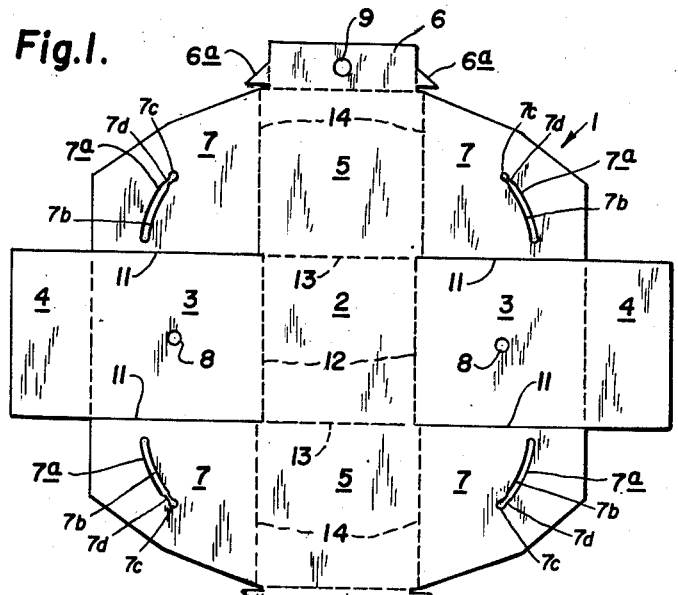

Sept. 29, 1964

R. D. SABOL 3,150,812

TROUGH-BOX

Filed July 19, 1963

INVENTOR.
RUSSELL SABOL

BY his ATTORNEY

United States Patent Office 3,150,812
Patented Sept. 29, 1964

3,150,812
TROUGH-BOX
Russell D. Sabol, 914 Walnut St., Follansbee, W. Va.
Filed July 19, 1963, Ser. No. 297,484
6 Claims. (Cl. 229—16)

This invention relates generally to an expandable container, and more particularly, to the creation of an expandable shipping container which may have its inner volume increased at its point of destination for the addition of materials other than those shipped, and to provide an expandable shipping container which can be converted into a disposable mixing container and which may then be used for the mixing of such substances as cement, concrete, plaster, mortar and similar materials.

It has as its principal object to provide an expandable container for the initial transportation of dry mixes of cement, concrete, plaster, mortar and related materials, and subsequently to provide a trough-like container with greater volume than the original container into which water or other solvent or additive may be added, and in which the dry mix may be prepared for immediate use without the necessity of first transferring the dry mix to a mixing container such as a mortar box, wheelbarrow, bucket, or the like.

A further object of this invention is to provide a compact shipping container expandable to a trough-like mixing container, and which may be destroyed after use is made of it, thereby adding an expendable quality to the expandable container.

The ordinary method of shipping dry mixes at the present time is by paper shipping sack. When use is to be made of the dry mix, it is necessary to transfer portions of the dry mix into a mixing container or to the ground, then to add water, to mix and to use. Shipping such a mixture in a paper shipping sack may cause the mix to become moist, to harden, and thereby to become unusable or difficult to work with. The paper shipping sack has less strength than a shipping container made from corrugated medium, plastic, or similar material, and may when being used by the ultimate user be torn or damaged in such way as to cause loss of the dry mix or cause spilling of the dry mix in and about the working area of the ultimate user. Spillage is possible in transferring the mix from a paper shipping sack to the mixing container. It is, therefore, a more particular object of this invention to provide a clean, neat, strongly rigid or semi-rigid container for the shipping of dry mixes, and which container may, by increasing the volume of the box, be used subsequently as a mixing container for the mix thereby enabling the user to avoid transferring the dry mix from one container to the other, and thereby avoiding the chances of spillage, and which container, by the very nature of its rigidity or semi-rigidity, avoids the problems attendant to possible damage to paper shipping sacks.

It is a further object of the invention to provide an adjustable volume shipping container whose adjustability provides additional strength in the plurality of sides of the container, and whose construction tends to cause self-sealing inside the container upon the addition of water, a solvent, or other additive material for the purpose of making a wet mix from the dry mix originally shipped in the container. This is accomplished by having the weight of the mix press outwardly against a movable side of the container thereby sealing the container in part.

A further object of this invention is to provide a disposable mixing container for mixing cement, concrete, plaster, and the like, and which container, in the first instance, is the shipping container for the dry mix.

A further object of this invention is to provide a shipping container which can be more compactly filled with dry mix, thereby avoiding the shifting and moving of the dry mix within the container causing weakness or breakage, and yet a container whose inner volume may be increased simply by pulling inner flaps outwardly causing movable sides of the container to rotate outwardly to provide a container of greater volume for use as a mixing container by adding water, liquid, or other additive to the original mix, and providing sufficient additional volume to accomplish the mixing by transforming the dry mix into an immediately usable wet mix within the container.

The foregoing are examples of the advantages and objects of the invention, and are made without consideration of such advantages as ease of stacking, ease of palletizing, ease of shipping and facility for display. Need be mentioned at this point also of the fact that this combination container may, with the four movable sides, or two movable sides, as the case may be, be built of practically any size.

Figure 2:
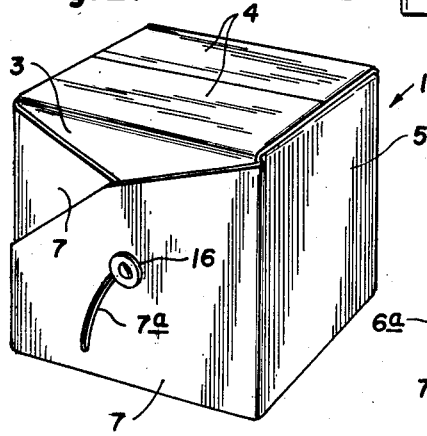
Figure 3:
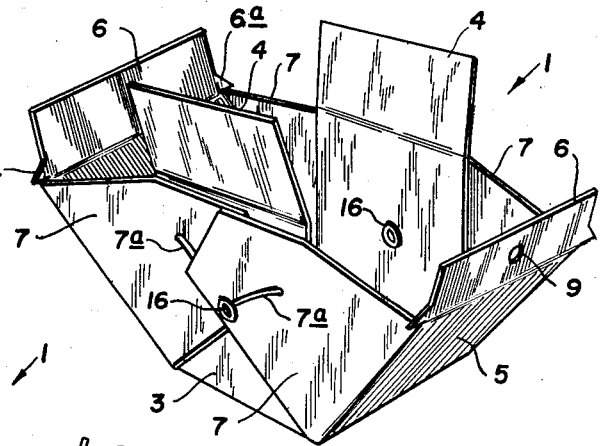
Figure 4:
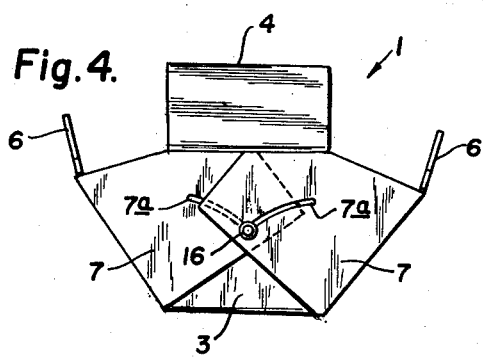

These and other objects and advantages of the expandable shipping container will become apparent from the following description taken in connection with the accompanying drawing in which FIG. 1 is a flat view of the unfolded container; FIG. 2 is a perspective view of the container in its nonexpanded or shipping position; FIG. 3 is a perspective view of the container in its expanded or mixing position; and FIG. 4 is a side view of the container showing the expanded or mixing position.

While this invention is susceptible of various modifications and alternative constructions, it is here shown and will hereinafter be described in a preferred embodiment. It is not intended, however, that the invention necessarily be limited thereby to the specific disclosure made, but, on the contrary, is intended to cover all modifications and alternative constructions falling within the spirit and scope of this invention as defined in this specification and in the appended claims. For instance, the container may be constructed to have only one side rotate outwardly for use as a shipping container for such items as square floor tile, or rectangular ceiling tile, or round objects, or other products difficult of removal singly from a container. Breakage of corners and bending the product can be avoided by removing them singly from a container whose one end rotates outwardly to make access to the interior easier. Such a container also provides a good storage container into which surplus materials may be easily returned without the attendant problems of dropping the item into a container of about the same shape, but slightly larger in perimeter. Such containers as this with one end expandable makes the initial packaging by a manufacturer or packager simpler.

This invention may also provide one rotating side on the inside and one rotating side on the outside of the fixed sides of the container for a more sift-proof container.

The invention may also provide a liner, wax coating, or other waterproof coating on the inside of the box for additional sift-proofing and waterproofing.

As shown herein, however, for purposes of disclosure, the expandable shipping container 1 comprises generally a one piece sheet of material which may be corrugated paper or paperboard, plastic, metal, or other material of a rigid or semi-rigid nature, which sheet is divided generally by creases or folds 12, 13, 14, and by edges 11 into 13 sections, one of which forms the bottom 2 of the container, four of which (3 and 5) form the rigid or semi-rigid sides of the container in its nonexpanded condition, and four of which 7 are the movable sides of the container in its expanded condition. The four movable sides 7 also lend strength and additional rigidity to the shipping container in its nonexpanded condition. The movable sides 7 may be constructed so that each coincides with the shape of a side 3 when the container is in the non-expanded or shipping position, this to provide additional strength to create more sift-proof qualities when desirable. In the event of such construction, the movable side 7 may be creased along what are shown as the outer edges in FIG. 1 to enable it to be folded out of the way by the person mixing materials in the container. The four side panels 7 (or two side panels, if only one movable side is to be rotated to the expanded position) are equipped with arc-like slip slots with integrated lock 7a, including an elongated arcuate slot 7b having a width substantially equal to the diameter of the fastening means 16, and an opening 7c adjacent the end of the slot 7b most remote from edges 11 and having a diameter substantially equal to the diameter of the fastening means 16. Opening 7c and slot 7b are joined by a slot 7d having a width less than the diameter of fastening means 16 so that, upon assembly, when fastening means 16 is inserted through openings 7c in side panels 7 and holes 8 in sides 3, the integrally formed lock will releasably retain side panels 7 against movement. When it is desired to expand the box, pressure applied to side 5 will deform the walls of side panels 7 adjacent slot 7d and force fastening means 16 through slots 7d to slot 7c to permit side panels 7 to rotate outwardly with arcuate slots 7b sliding along fastening means 16. It is preferable to provide fastening means 16 of the snap-lock variety to enable tight fastening, but also enabling rotation of side panels 7 around fastening means 16. The movement of the slot equipped side panels 7 in both the horizontal and vertical planes around fastening means 16 provides for the expansion or increase of the inner volume of the box, and is calculated to provide more than one third additional volume inside the container after it has been expanded as compared with the volume in its nonexpanded condition.

The shipping container is also equipped with inner flaps 6 creased as in FIG. 1 for the purpose of folding inwardly or outwardly, inwardly to provide an inner top cover for the container and outwardly to remove them from interfering with the use of the container as a mixing trough, and to enable pulling ends 5 outwardly to expand the box. Flaps 4 are similarly provided with means to fold inwardly and outwardly, inwardly to provide an outer top cover for the container, and outwardly to remove them from interfering with the use of the container as a mixing trough. Flaps 4 may be taped or stapled together and may be overlapped and stapled together to draw the container tighter for added sift-proof qualities.

Flaps 8 are equipped with grips 9 to enable the user to grasp flaps 6 and pull them outwardly, thereby expanding the container's inner volume. Flaps 6 are also equipped with appendages 6a which may be in the form shown in FIG. 1, or small webs or fillets near the intersection of the edge flaps 6, and the edge of movable sides 7 to provide a sealed corner when the container is in its closed or shipping position as shown in FIG. 2. Flaps 4 may also be adapted as a carrying handle atop the closed and sealed shipping container. The axis 16 may be constructed of any one of a number of materials and is fitted upon two opposing sides of the container, and on which axis the slots 7a of the four movable sides 7 or two movable sides as the case may be, may move in both the horizontal and vertical planes. The maximum outward movement of sides 7 provide angles and lines so that the container in its nonexpanded or shipping condition, as in FIG. 2, forms a cube, and so that the container in its expanded or mixing condition forms a straight line top for the mixing trough to provide rigidity to the mixing trough. In the event one set of sides 7 are placed inside sides 3, and one set of sides 7 are placed outside sides 3, the creases 14 in the upper end 5 as shown in FIG. 1 shall be less distance apart than the creases 12, and hence less distance apart than creases 14 in the lower end 5 as shown in FIG. 1. Also in such case upper sides 7 as shown in FIG. 1 shall be cut so as to coincide with the shape of sides 3 in nonexpanded condition as shown in FIG. 2, and shall be creased along what is shown in FIG. 1 as the outer edge of upper sides 7 as mentioned hereinbefore for additional strength and more sift-proof qualities.

The axis may be fitted with inside and outside washers which may or may not be depressed into the shipping container medium. It would be necessary to have the inside washers depressed in the event that such items as floor tile or ceiling tile are to be placed in the box for shipment. This is not critical in dry mix containers.

It seems apparent from the foregoing description that I, Russell D. Sabol, have perfected a vastly improved rigid, or semirigid shipping container providing a fixed volume for shipment, and providing an expanded volume for subsequent use of the container as a disposable mixing trough, and which provides a clean, neat, method for mixing dry mixes with water or other liquid or additives in the container, and for using the mix directly from the shipping container to the job to be accomplished, and which provides a shipping container which may be shipped compactly filled with dry mix, and which, when expanded, provides up to more than one-third additional volume for the addition of a liquid or other additive, and which, as a shipping container or a mixing trough, provides a tight and self-sealing inside which tends to prevent the escape of dry mix or the prepared wet mix, and which when movable at one end only may be used as a combination shipping and storage easy-in, easy-out container.

I claim:

1. An expansible folded blank box comprising a rectangular bottom, two oppositely disposed fixed sides and at least one side movable about a fold line between its lower edge and said bottom from a vertical position to an inclined position to expand the internal volume of the box, a pair of side panels integrally formed one on each side of said movable side and disposed in overlying relation with respect to said fixed sides, arcuate slots formed in said side panels, and fastening means mounted on each of said fixed sides in position engaging said arcuate slots to limit movement of said side panels with respect to said fixed sides upon movement of said movable side, said fixed sides and said side panels cooperatively forming continuous substantially liquid tight sides for the box when said movable side is in said expanded position, and locking means releasably retaining said movable side against movement when said movable side is in said vertical position, said locking means including an opening extending through said side panels adjacent one end of said arcuate slot in position receiving said fastening means when said movable side is in said vertical position, and means between said opening and said end of said arcuate slot resisting passage of said fastening means between said opening and said slot.

2. An expansible folded blank box comprising a rectangular bottom, two oppositely disposed fixed sides and two oppositely disposed movable sides, the latter being movable about the fold line between their respective bottom edges and said rectangular bottom from a vertical position to an inclined position to expand the internal volume of the box, a pair of side panels being integrally formed one on each vertical side edge of each of the movable sides and disposed in parallel overlying relation with respect to said fixed sides, an elongated arcuate slot formed in each of said side panels, fastening means mounted on each of said fixed sides and extending through said side panels maintaining said parallel overlying relation, said side panels being movable in a plane parallel to the plane of said fixed sides upon movement of said movable panel with said fastening means extending through said arcuate slots limiting rotation of said movable side, said side panels and said fixed sides cooperatively forming continuous substantially liquid-tight sides for the box when said movable sides are moved to said expanded position, and means at one end of said arcuate slots engaging said fastening means for releasably retaining said movable side in said vertical position.

3. The invention according to claim 2 wherein said means releasably retaining said movable side in said vertical position includes an opening extending through said side panels and spaced from the end of said arcuate slot, with a portion of said side panel between said slot and said opening engaging said fastening means when said movable side is in said vertical position and being deformable upon rotation of said movable side to permit said arcuate slot to slide along said fastening means.

4. The invention according to claim 3 wherein said opening has a diameter substantially equal to the diameter to said fastening means and is connected to said arcuate slot by a second slot having a width less than the diameter of said fastening means.

5. The invention as defined in claim 4 wherein the box is formed from a folded paperboard blank having a coating of moisture-resistant material covering its inner surface to render the box moisture-proof.

6. An expansible folded blank box as defined in claim 4 and having a top formed by a pair of inner flaps and a pair of outer flaps, and corner fillets formed on one pair of said flaps to render the top corners of the box sift-proof.

References Cited in the file of this patent

UNITED STATES PATENTS

| 1,375,794 | McSheeby | Apr. 26, 1921 |
| 2,187,304 | Farmer | Jan. 16, 1940 |
| 2,663,487 | Paige | Dec. 22, 1953 |
| 2,793,802 | Scaturro | May 28, 1957 |

FOREIGN PATENTS

| 23,587 | Finland | Oct. 14, 1949 |
| 734,212 | Great Britain | July 27, 1955 |